(12) United States Patent
Ishino

(10) Patent No.: US 7,207,676 B2
(45) Date of Patent: Apr. 24, 2007

(54) IMAGE PROJECTION APPARATUS

(75) Inventor: Hirohisa Ishino, Kanagawa (JP)

(73) Assignee: Sony Corporation, JPX ( * ) Notice: Subject to any disclaimer, the term of this patent is extended or adjusted under 35 U.S.C. 154(b) by 317 days.

(21) Appl. No.: 10/935,409

(22) Filed: Sep. 7, 2004

(65) Prior Publication Data

US 2005/0073656 A1  Apr. 7, 2005

(30) Foreign Application Priority Data

Sep. 8, 2003  (JP) .......................... P2003-315830

(51) Int. Cl.
*G03B 21/14* (2006.01)
*G03B 21/26* (2006.01)
*G03B 21/28* (2006.01)
*G02F 1/1335* (2006.01)
*G02F 1/00* (2006.01)
*G02B 5/30* (2006.01)
*G02B 27/28* (2006.01)
*G02B 27/14* (2006.01)
*G02B 27/12* (2006.01)
*H04N 5/74* (2006.01)

(52) U.S. Cl. ............................ 353/20; 353/33; 353/34; 353/37; 353/81; 353/82; 349/8; 349/9; 359/495; 359/638; 359/640; 348/757

(58) Field of Classification Search .................. 353/20, 353/30, 31, 33, 34, 37, 81, 82, 102; 349/5, 349/7–9, 96; 348/739, 744, 750, 757, 758; 359/483, 494, 495, 618, 629, 634, 636, 638–640

See application file for complete search history.

(56) References Cited

U.S. PATENT DOCUMENTS 6,416,184 B1 * 7/2002 Arai et al. ..................... 353/52
6,893,131 B2 * 5/2005 Imahase et al. ............... 353/31

* cited by examiner

*Primary Examiner*—W B Perkey
*Assistant Examiner*—Rochelle Blackman
(74) *Attorney, Agent, or Firm*—Lerner, David, Littenberg, Krumholz & Mentlik, LLP (57) ABSTRACT

A reflection type projector apparatus uses polarized beam filters that are resistant to fluctuations in incident angle as the light beam splitting elements and in which are provided for the blue color beam a blue color use liquid crystal reflection panel, a polarized beam filter, a linear polarization plate, and a ½ wavelength plate arranged at one side face of a cross prism, with a blue color beam emitted toward the blue color use liquid crystal reflection panel. The blue color beam passes through the polarized beam filter, striking the blue color use liquid crystal reflection panel, and is modulated when reflected. The blue color modulated beam is reflected toward the cross prism at the polarized beam filter, and then passes through the linear polarization plate and the ½ wavelength plate, strikes the cross prism, and is projected to the screen by a projection lens.

13 Claims, 7 Drawing Sheets

FIG. 5B  PBS  PRIOR ART

FIG. 5A  PBF

COMPARISON OF TRANSMISSION RATE ANGLE DEPENDENCY
BETWEEN POLARIZED BEAM FILTER AND POLARIZED BEAM SPLITTER

FIG. 6

PRIOR ART

FIG. 7
PRIOR ART

IMAGE PROJECTION APPARATUS

BACKGROUND OF THE INVENTION

1. Field of the Invention

The present invention relates to an image projection apparatus (projector apparatus). More particularly the present invention relates to a projector apparatus using a liquid crystal panel etc. as an image displaying means. Specifically, the present invention relates to a reflection type image projection apparatus of a type reflecting light at a reflection type liquid crystal panel or other image displaying means and modulating the same.

2. Description of the Related Art

As the projector apparatuses using liquid crystal display devices (liquid crystal panels) for displaying images on image displaying means by modulating polarized beams, transmission type projector apparatuses passing modulated beams through the liquid crystal panels and modulating the modulated beams in the process of passage through the liquid crystal panels and reflection type projector apparatuses projecting modulated beams to the liquid crystal panels and modulating the projected modulated beams when reflected at the liquid crystal panels to change the polarization axes are known. The present invention particularly relates to the latter reflection type projector apparatuses.

As a reflection type projector apparatus, the one disclosed in for example Japanese Unexamined Patent Publication (Kokai) No. 8-15794 is known. The reflection type projector apparatus disclosed in Japanese Unexamined Patent Publication (Rokai) No. 8-15749 aims at a reduction of size and reduction of thickness by avoiding interference between the illumination system and the optical system as much as possible.

Figure 7:
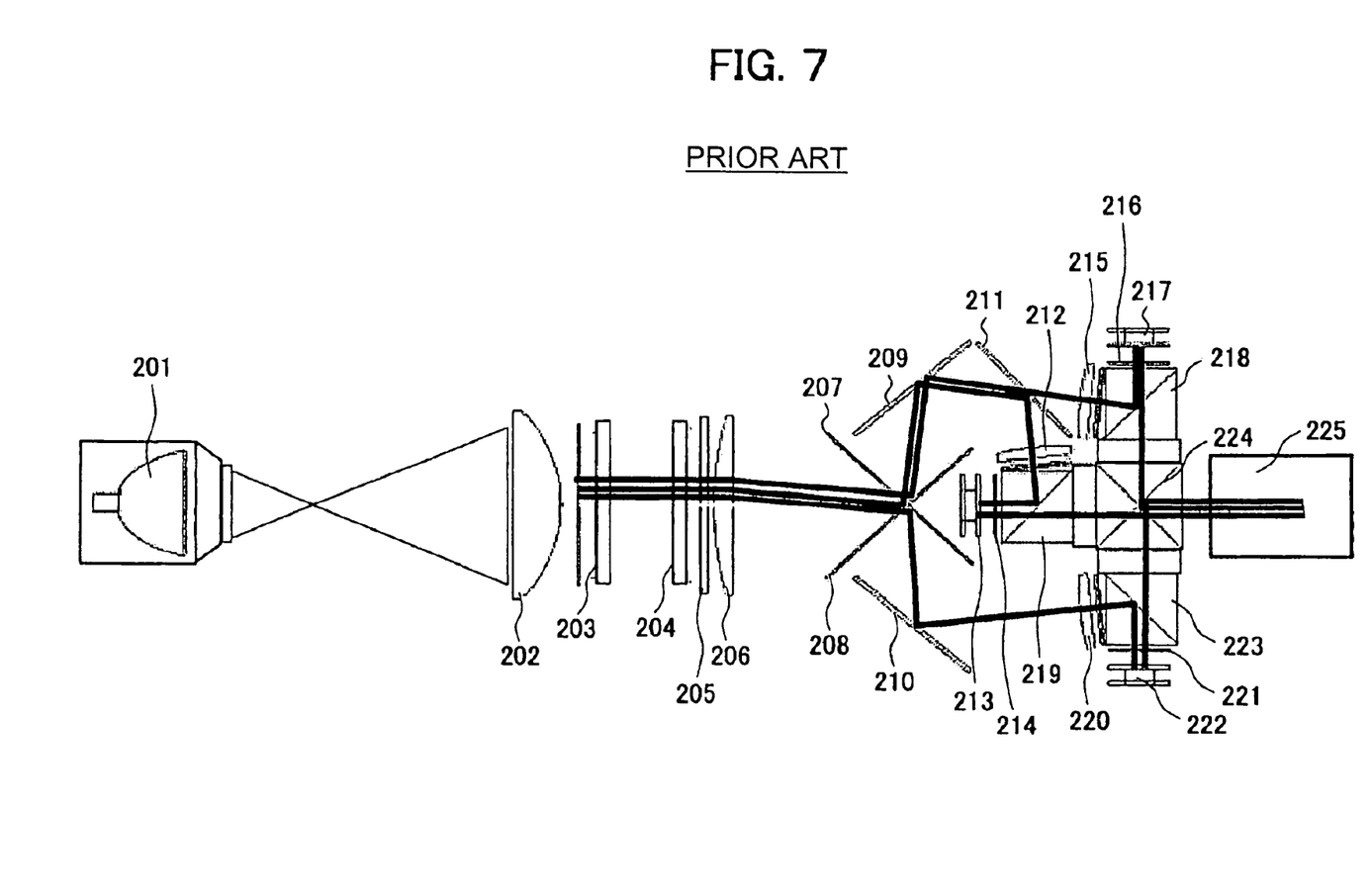
FIG. 7 is a view illustrating an optical system of a reflection type projector apparatus using polarized beam splitters.

FIG. 7 is a view of the configuration of an optical system of a reflection type projector apparatus using a reflection type liquid crystal panel (LCOS: Liquid Crystal on Silicon) as the image display unit as a typical example of such a reflection type projector apparatus. The reflection type projector apparatus illustrated in FIG. 7 has, as a light source assembly for providing three primary colors, that is blue, green, and red, a lamp 201 for outputting a white color beam, a collimator lens 202, fly eyes lenses 203 and 204, a PS converting means 205 for converting a beam of for example a P-polarized component of the incident light to an S-polarized beam and outputting the same, a main condenser lens 206, a blue color reflection dichroic mirror 207, a green and red color reflection dichroic mirror 208, full reflection mirrors 209 and 210, and a green reflection dichroic mirror 211.

The reflection type projector apparatus further has a cross prism 224 and three polarized beam splitters (PBS) arranged around this cross prism 224, that is, a first polarized beam splitter 218, a second polarized beam splitter 219, and a third polarized beam splitter 223. The reflection type projector apparatus has a projection lens 225 at the side facing the second polarized beam splitter 219 across the cross prism 224. A condenser lens 212 is arranged at one side of the second polarized beam splitter 219, and a green color use liquid crystal reflection panel 213 and a ¼ wavelength plate 214 are arranged at the other side. A condenser lens 215 is arranged at one side of the first polarized beam splitter 218, and a red color use liquid crystal reflection panel 217 and a ¼ wavelength plate 216 are arranged at the other side. A condenser lens 220 is arranged at one side of the third polarized beam splitter 223, and a green color use liquid crystal reflection panel 222 and a ¼ wavelength plate 221 are arranged at the other side.

The three primary color beams, that is, the blue beam, the green beam, and the red beam, are output from the light source assembly as follows. The red beam is obtained from the white beam output from the main condenser lens 206 reflected at the green and red reflection dichroic mirror 208, reflected at the full reflection mirror 209, passed through the green reflection dichroic mirror 211, and striking the condenser lens 215. The green beam is obtained from the white beam output from the main condenser lens 206 reflected at the green and red reflection dichroic mirror 208, reflected at the full reflection mirror 209, reflected at the green reflection dichroic mirror 211, and striking the condenser lens 212. The blue beam is obtained from the white beam output from the main condenser lens 206 reflected at the blue reflection dichroic mirror 207, reflected at the full reflection mirror 210, and striking the condenser lens 220.

The green beam striking the condenser lens 212 is reflected at the second polarized beam splitter 219, passes through the ¼ wavelength plate 214, strikes the green color use liquid crystal reflection panel 213, is modulated there, then passes through the second polarized beam splitter 219, strikes the cross prism 224, and is projected from the projection lens 225 to a screen (not illustrated) located in front. The red beam striking the condenser lens 215 is reflected at the first polarized beam splitter 218, passes through the ¼ wavelength plate 216, strikes the red color use liquid crystal reflection panel 217, is modulated there, then passes through the first polarized beam splitter 218, strikes the cross prism 224, and is projected from the projection lens 225 to the screen (not illustrated) located in front. The green beam striking the condenser lens 220 is reflected at the third polarized beam splitter 223, passes through the ¼ wavelength plate 221, strikes the green color use liquid crystal reflection panel 222, is modulated there, then passes through the third polarized beam splitter 223, strikes the cross prism 224, and is projected from the projection lens 225 to the screen (not illustrated) located in front.

The light source unit providing the three primary color beams can be arranged above the above configuration or the like as illustrated in Japanese Unexamined Patent Publication (Rokai) No. 8-15794.

The reflection type projector apparatus using the first polarized beam splitter 218, the second polarized beam splitter 219, and the third polarized beam splitter 223 suffers from the problem that the brightness is insufficient since the F number of the illumination optical system cannot be made small.

Figure 5A:
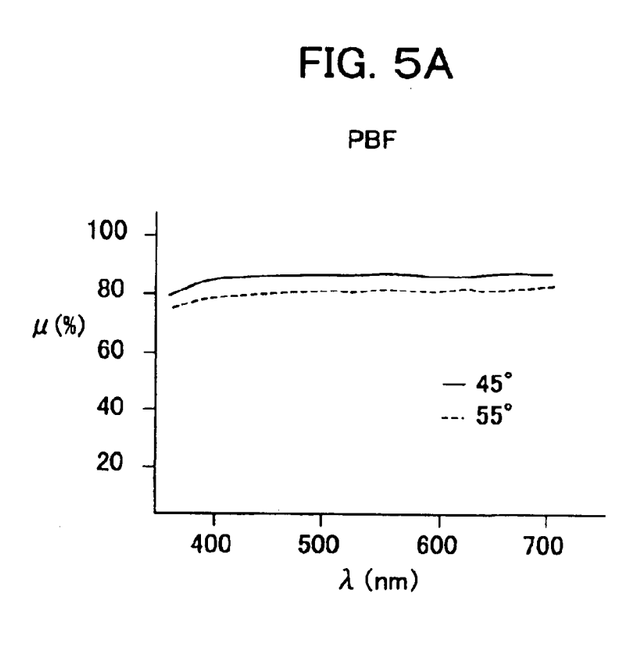
FIGS. 5A and 5B are graphs of characteristics of a polarized beam filter and a polarized beam splitter.
Figure 5B:
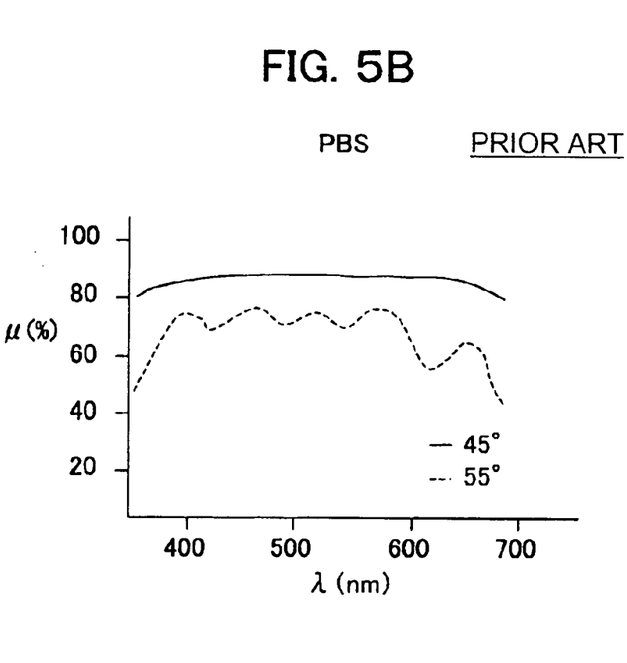

Further, as illustrated in FIG. 5B, a polarized beam splitter suffers from the problem that the incident angle dependency is high. If there is an oblique incident beam, the transmission rate is lowered, so the contrast of the image projected from the projection lens 225 is lowered. In order to solve this, it becomes necessary to arrange parts of the optical system with a high precision and further finely adjust their positions.

Further, a polarized beam splitter has relatively large dimensions and is heavy in weight. As a result, there are limits to the reduction of the size of a reflection type projector apparatus.

When using polarized beam splitters, therefore, optical system is complex as a whole and the arrangement of the optical parts is difficult. Further, the mounting of the optical parts is difficult.

Further, a reflection type projector apparatus includes elements generating heat such as the lamp 201, the green color use liquid crystal reflection panel 213, the red color use liquid crystal reflection panel 217, and the green color use liquid crystal reflection panel 222, so measures for cooling these elements (heat dissipation measures) become necessary, but when a large number of parts are accommodated in a narrow space, it is difficult to sufficiently take heat dissipation measures or cooling measures.

SUMMARY OF THE INVENTION

An object of the present invention is to provide an image projection apparatus overcoming the above problems, small in size, light in weight, excellent in contrast, enabling sufficient cooling measures, and advantageous also in view of mounting.

According to a first aspect of the present invention, there is provided an image projection apparatus having three reflection type image display units using three primary colors of red, green, and blue as illumination light, provided corresponding to the three primary color beams, and modulating the primary color beams in accordance with image display signals to display images, a cross prism for combining the modulated primary color beams, and a projection lens for projecting the combined beam to a screen, the apparatus provided with polarized beam filters, each arranged at orientation forming an angle of about 45 degrees with respect to an incident face of the cross prism and a display surface of an image display unit so that the primary color modulated image beam emitted from the image display unit is reflected and strikes the incident face of the cross prism and each passing a first polarized beam therethrough and reflecting a second polarized beam having a polarization axis orthogonal to the first polarized beam; arranging display surfaces of the image display units so as to be substantially parallel to planes vertical to four inside surfaces of the cross prism and substantially orthogonal to three primary color incident faces of the cross prism; and making the primary color illumination beams incident from the opposite side of the image display units across the polarized beam filters illuminate the image display units.

Preferably, the primary color illumination beam striking each polarized beam filter is set so that its polarization plane has an orientation of a P-polarized beam with respect to the polarized beam filter. Further preferably, each polarized beam filter is arranged in its orientation so as to reflect an S-polarized beam and pass a P-polarized beam.

Preferably, when an image display unit displays 0% black color, it does not modulate the incident primary color beam, while when the image display unit displays 100% of the corresponding primary color beam, it modulates the incident primary color beam so that its polarization plane is rotated by about 90 degrees.

Preferably, for each of two primary color beams among the three primary color beams forming primary colors by reflecting light at the reflection faces of the cross prism, a ½ wavelength plate is arranged between the cross prism and the corresponding polarized beam filter for making the light strike a reflection face of the cross prism to become an S-polarized beam.

Preferably, a linear polarizing means is arranged between the ½ wavelength plate and the polarized beam filter so as to be substantially parallel to the ½ wavelength plate, and the transmission axis of the linear polarizing means is configured in orientation to give substantially a P-polarized beam with respect to a reflection face of the cross prism.

Preferably, a linear polarizing means is arranged at a reflection face of the cross prism so as to be substantially parallel to the incident face of the cross prism for one primary color beam formed by passage of light, and the transmission axis of the linear polarizing means is oriented so as to become make that beam a P-polarized beam with respect to the reflection face of the cross prism.

According to a second aspect of the present invention, there is provided an image projection apparatus having a cross prism; three optical systems having reflection type image display units arranged at side faces in three directions of the cross prism and arranged so as to be substantially parallel to planes vertical to four inside surfaces of the cross prism and substantially orthogonal to the corresponding side faces and polarized beam splitting portions for splitting the incident light, modulating illumination lights of three primary colors of red, green, and blue by the image display units, and outputting the results via the polarized beam splitting portions to the cross prism; and a projection lens arranged on the other side of the cross prism at which the three optical systems are not arranged.

Preferably, the three optical systems are arranged on substantially the same plane. Further, preferably, provision is made of a cooling means for cooling the image display units arranged on substantially the same plane.

Preferably, each image display unit is arranged so that its reflection face (display surface) is oriented downward. Further preferably, provision is further made of a light source unit for providing three primary color beams striking the image display units after passing through the polarized beam splitting portions from below the three optical systems.

Summarizing the effects of the present invention, the invention uses polarized beam filters in place of polarized beam splitters as the polarizing and deflecting means. Polarized beam filters, as illustrated in FIG. 5A, have small wavelength dependencies and small incident angle dependencies. By using polarized beam filters having such advantages, the following effects can be exhibited.

The image projection apparatus of the present invention using polarized beam filters can reduce the F number compared with an image projection apparatus using polarized beam splitters, so can raise the luminance and improve the contrast. Further, the image projection apparatus of the present invention using polarized beam filters has leeway in the layout of optical parts compared with an image projection apparatus using polarized beam splitters. Further, fine adjustment of the positions of the optical parts after assembling the optical systems becomes unnecessary.

When using polarized beam filters, a configuration decreasing the number of times of passage by one compared with the case of using the polarized beam splitters can be employed. As a result, the image projection apparatus of the present invention using polarized beam filters can further raise the luminance and improve the contrast.

The image projection apparatus of the present invention enables a neat arrangement of the optical systems etc. In addition, the cross prism and three optical systems can be arranged on the same plane, and the dimension in the height direction can be made small. The image projection apparatus of the present invention is further easy in design of layout and has a high accommodation efficiency as well, so can accommodate parts compactly and can achieve a reduction of size and a reduction of weight. Polarized beam filters are small in size and light in weight, so a further reduction of size and lightening of weight can be achieved.

The image projection apparatus of the present invention enables easy cooling measures and is high also in the cooling effect. The image projection apparatus of the present invention enables easy connection of the image display units etc. by cables and is advantageous also in view of mounting.

The image projection apparatus of the present invention has high flexibility of arrangement of the projection lens and can easily mount also a vertical shift mechanism of the projection lens.

In the image projection apparatus of the present invention, dust etc. floating in a housing has a hard time sticking to the panel surfaces, the drop in the levels of polarized beams due to sticking of dust is small, and the drop of the display image quality is small.

In the image projection apparatus of the present invention, the focusing optical systems including the image display units are arranged compactly, and mechanical structural rigidity can be easily improved. Due to this, pixel position deviation etc. among the three image display units is hard to occur, so high quality images can be provided.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Figure 1A:
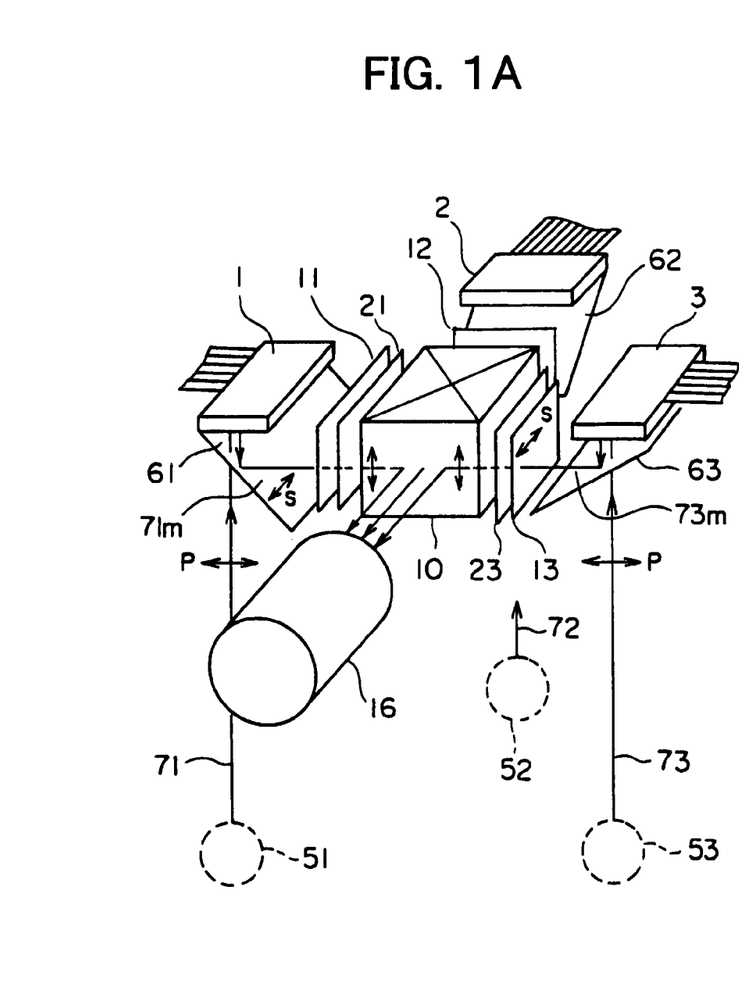
FIGS. 1A and 1B are perspective views of an image projection apparatus according to an embodiment of the present invention.
Figure 1B:
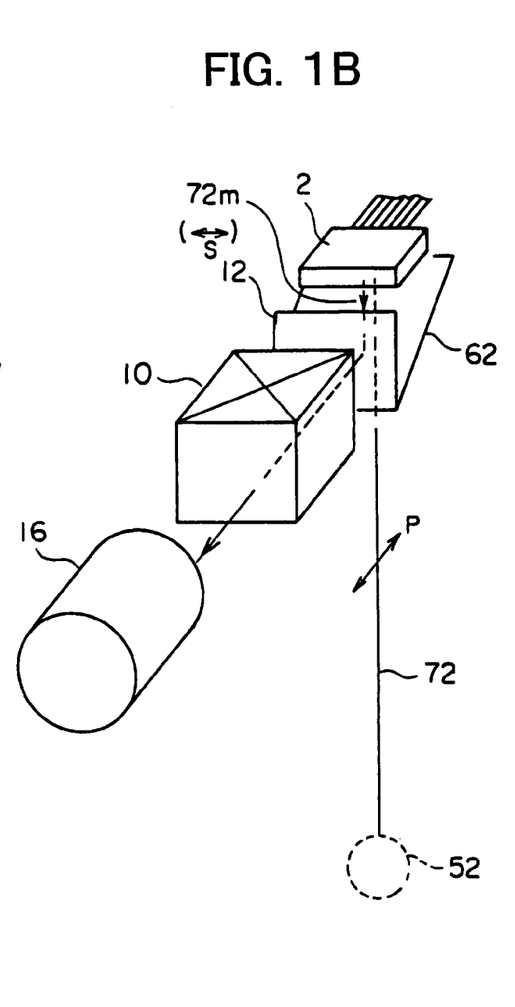
Figure 2:
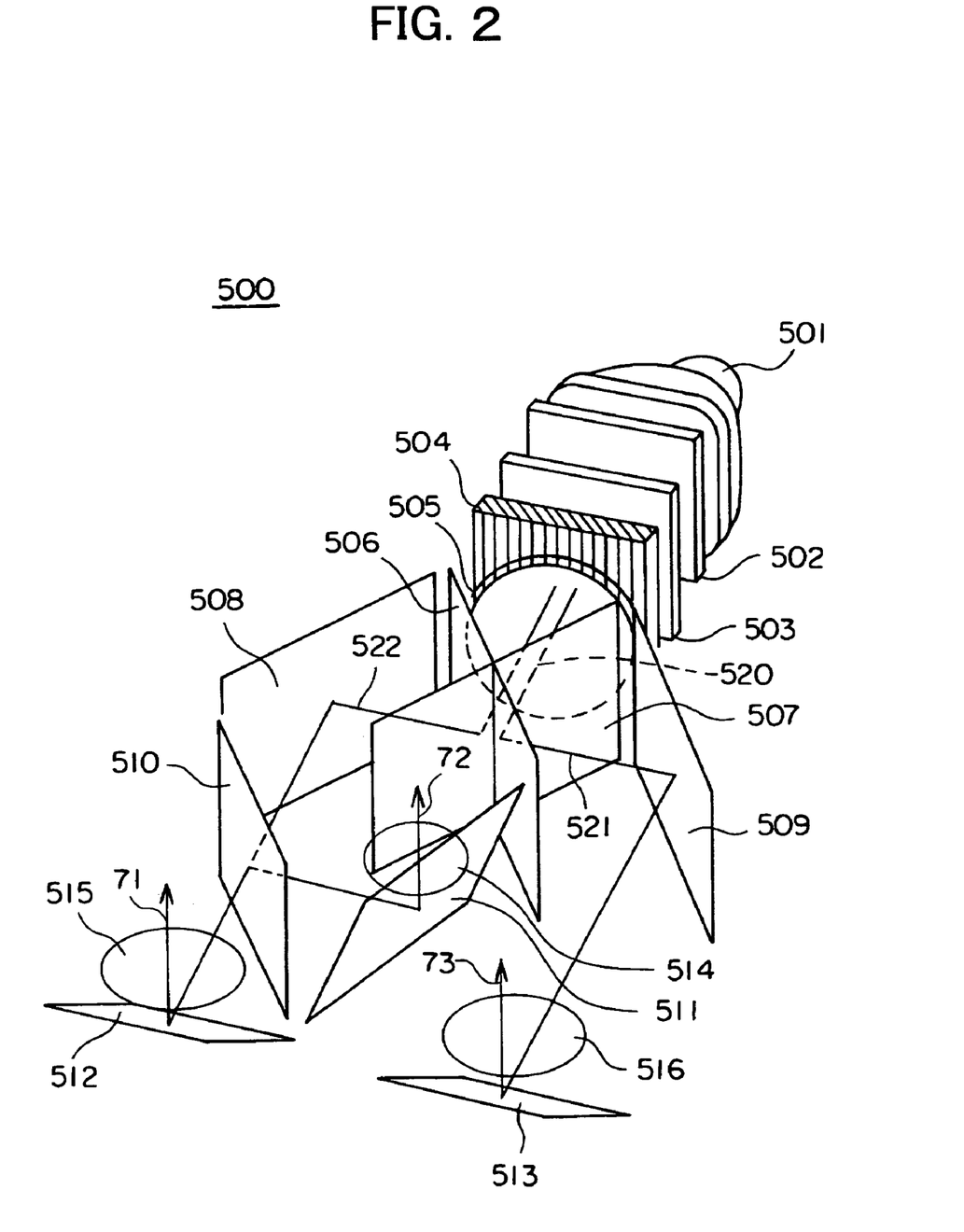
FIG. 2 is a view illustrating an example of the light source unit in the image projection apparatus illustrated in FIGS. 1A and 1B.
Figure 3A:
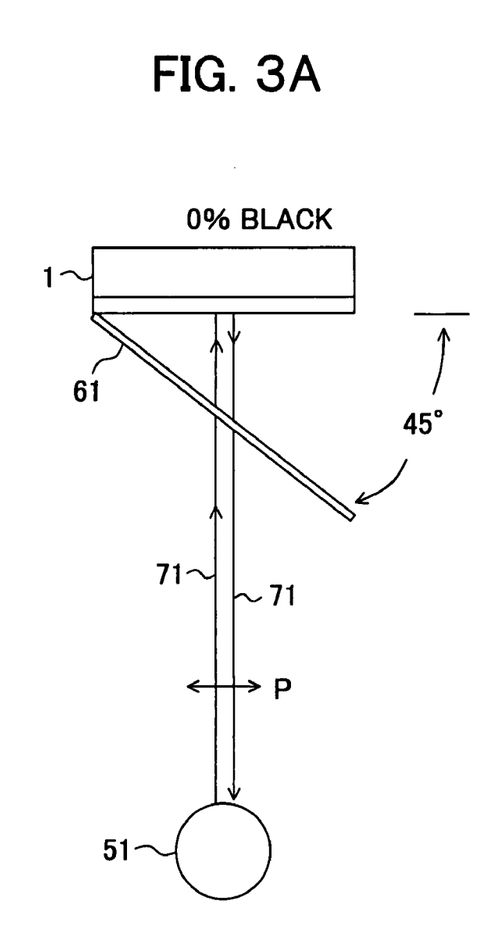
FIGS. 3A and 3B are views illustrating a partial configuration and beam path of the image projection apparatus illustrated in FIGS. 1A and 1B.
Figure 3B:
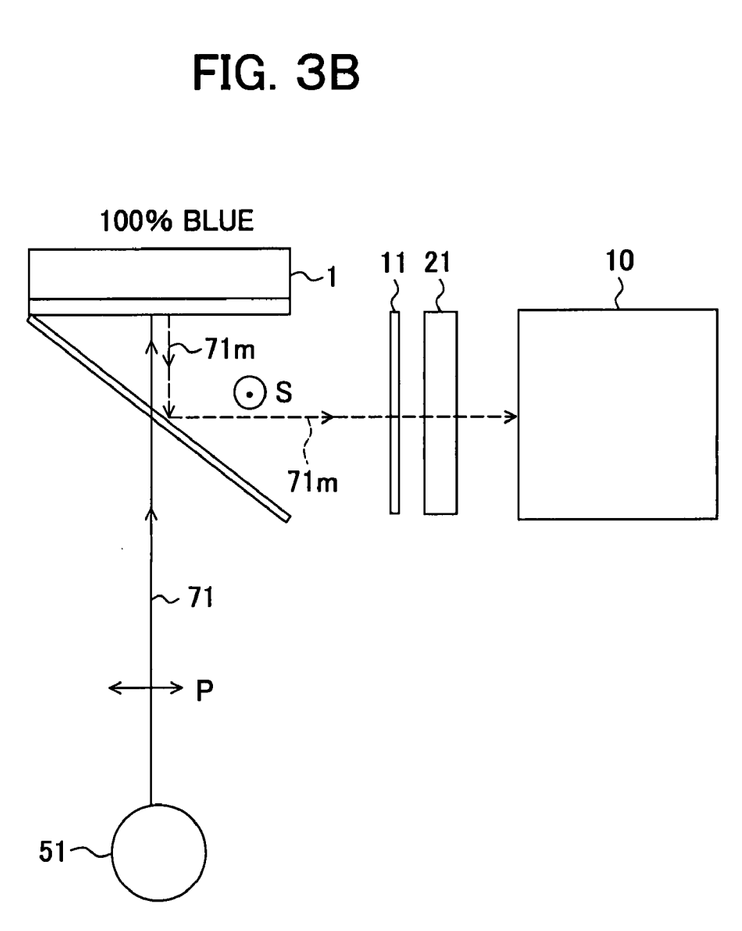
Figure 4:
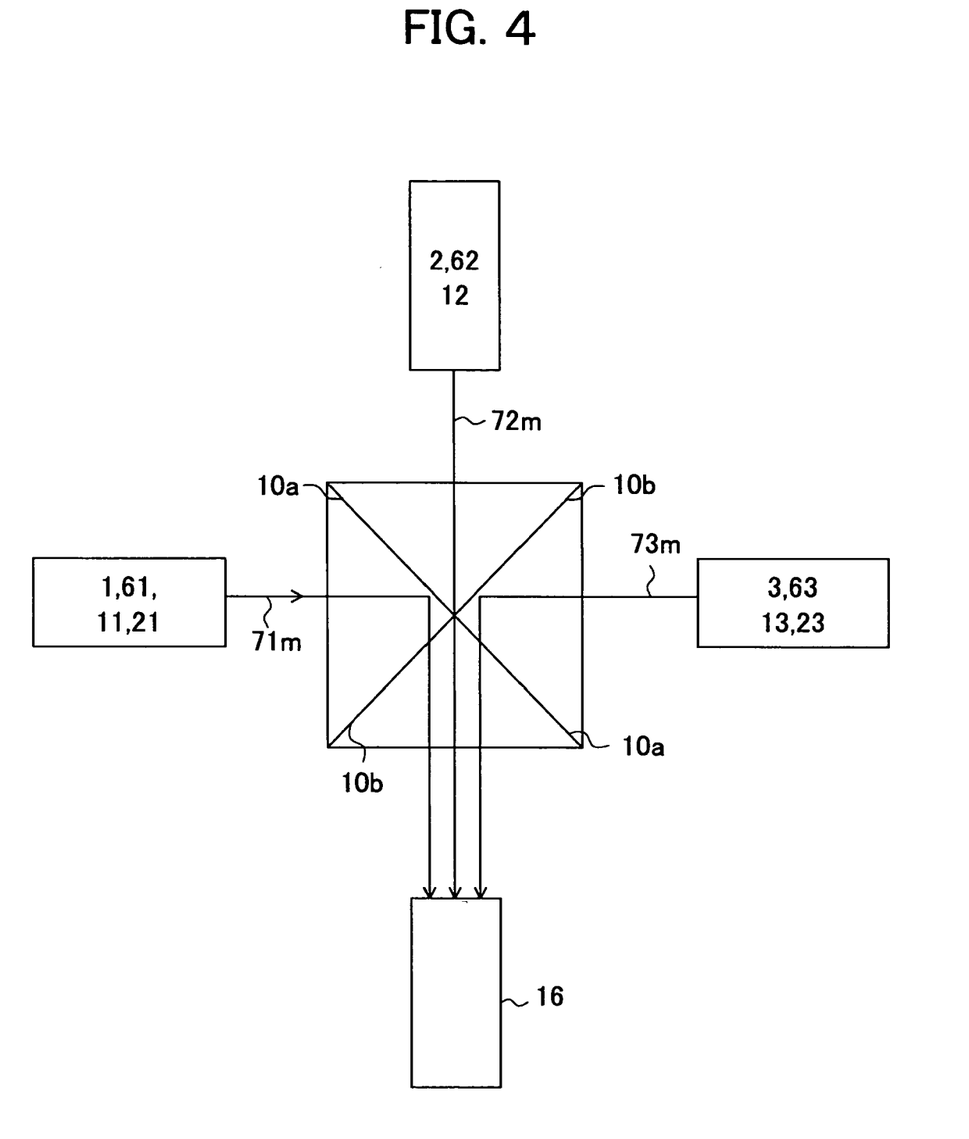
FIG. 4 is a diagram illustrating the beam paths around a cross prism illustrated in FIGS. 1A and 1B.

A reflection type projector apparatus according to an embodiment of an image projection apparatus (projector apparatus) of the present invention will be explained by referring to FIGS. 1A and 1B to FIGS. 3A and 3B. FIGS. 1A and 1B are perspective views of a projector apparatus according to a first embodiment of the present invention. FIG. 2 is a view of an example of the configuration of a light source unit which can be applied to the projector apparatus illustrated in FIGS. 1A and 1B. FIGS. 3A and 3B are views illustrating an example of the partial configuration and beam path in the projector apparatus illustrated in FIGS. 1A and 1B. FIG. 4 is a diagram schematically showing the arrangement of optical systems around a cross prism arranged in the projector apparatus illustrated in FIGS. 1A and 1B.

[Principal Components of Projector Apparatus]

In FIGS. 1A and 1B, a projector apparatus 100 has a cross prism 10 at the center in the illustration and has a projection lens 16 in front of that. The projector apparatus 100 has optical systems in three directions in total on two sides of the cross prism 10 and at the side opposite to the projection lens 16 across the cross prism 10. At the left side of the cross prism 10 in FIGS. 1A and 1B, as a first optical system, a first liquid crystal reflection panel 1, a first polarized beam splitter 61 serving as the means for splitting the polarized beam, a first linear polarization plate 11, and a first ½ wavelength plate 21 are provided. At the side opposite to the projection lens 16 across the cross prism 10 in FIGS. 1A and 1B, as a second optical system, a second liquid crystal reflection panel 2, a second polarized beam filter 62, and a second linear polarization plate 12 are provided. At the right side of the cross prism 10 in FIGS. 1A and 1B, as a third optical system, a third liquid crystal reflection panel 3, a third polarized beam filter 63, a third linear polarization plate 13, and a third ½ wavelength plate 23 are provided.

Note that the second optical system is not provided with a second wavelength plate corresponding to the first and third ½ wavelength plates 21 and 23. The reason for this is as follows: When combining the three primary color beams in the cross prism 10, two primary color beams among the three primary color beams, in the example illustrated in FIG. 4, a blue color modulated beam 71*m* striking a reflection face 10*a* in the cross prism 10 from the first optical system and a red color modulated beam 73*m* striking a reflection face 10*b* in the cross prism 10 from the third optical system, are reflected at the reflection faces 10*a* and 10*b* in the cross prism 10 and changed in optical paths by 90 degrees. On the other hand, the light striking the cross prism 10 from the second optical system is not reflected in the cross prism 10, but passes through it.

In the cross prism 10, the reflection faces 10*a* and 10*b* formed by dichroic coating films etc. are characterized by suitability for reflection of S-polarized beams and suitability for passage of P-polarized beams. Accordingly, in the present embodiment, the illustrated polarization state is selected. In order to adjust the polarization state in this way, the first optical system and the third optical system are provided with the ½ wavelength plates 21 and 23, but it is not necessary to provide a ½ wavelength plate for the second optical system. Note that, the method of selection of the two primary color beams among the three primary color beams can be appropriately determined.

The cross prism 10 and the projection lens 16 are arranged on substantially the same plane. Across from the cross prism 10, the first polarized beam filter 61, the first linear polarization plate 11, and the first ½ wavelength plate 21 of the first optical system, the second polarized beam filter 62 and the second linear polarization plate 12 of the second optical system, and the third polarized beam filter 63, the third linear polarization plate 13, and the third ½ wavelength plate 23 of the third optical system are arranged on substantially the same plane. In this way, the optical systems configuring the projector apparatus 100 are disposed (arranged) on substantially the same plane across the cross prism 10.

The projector apparatus 100 of this embodiment of the present invention has, in addition to the components (optical parts) of the optical systems mentioned above, three types of light sources 51 to 53 for outputting three primary color beams, that is, a blue color (B) beam, a green color (G) beam, and a red color (R) beam, but details will be explained later.

Each of the three liquid crystal reflection panels 1 to 3 serving as the image display units of the image projection apparatus of the present invention acts to modulate one color beam among the three primary color beams, that is, the blue color (B) beam, the green color (G) beam, and the red color (R) beam. These liquid crystal reflection panels 1 to 3 are substantially the same in configuration except that no ½ wavelength plate is provided in the second optical system. Which panel modulates which of the blue color (B) beam, the green color (G) beam, and the red color (R) beam can be freely set. Namely, which primary color beam is modulated by the first liquid crystal reflection panel 1, the second liquid crystal reflection panel 2, and the third liquid crystal reflection panel 3 can be freely set. In the present embodiment, as an example, the case where the first liquid crystal reflection panel 1 is made to function as the blue color use liquid crystal reflection panel for modulating the blue color beam, the second liquid crystal reflection panel 2 is made to function as the green color use liquid crystal reflection panel for modulating the green color beam, and the third liquid crystal reflection panel 3 is made to function as the red color use liquid crystal reflection panel for modulating the red color beam will be explained. For this purpose, naturally, a not illustrated image signal processing apparatus outputs an image signal for modulating the blue color to the blue color use liquid crystal-reflection panel 1, an image signal for modulating the green color to the green color use liquid crystal reflection panel 2, and an image signal for modulating the red color to the red color use liquid crystal reflection panel 3 in accordance with the image display content. Note that a detailed description of the image signal processing apparatus will be omitted.

[Light Sources]

The projector apparatus 100 has a blue color emitting light source 51 for emitting a blue color beam 71 orthogonal to the plane of the blue color use liquid crystal reflection panel 1, a green color emitting light source 52 for emitting a green color beam 72 orthogonal to the plane of the green color use liquid crystal reflection panel 2, and a red color emitting light source 53 for emitting a red color beam 73 orthogonal to the plane of the red color use liquid crystal reflection panel 3. These blue color emitting light source 51, green color emitting light source 52, and red color emitting light source 53 can be configured and arranged in various ways, but in the present embodiment, use can be made of ones having the configurations exemplified in FIG. 2. Note that, in the image projection apparatus of the present invention, the light sources are not essential requirements. Various other formats can be used other than that illustrated in FIG. 2. Accordingly, the light sources illustrated in FIG. 2 are only examples.

The light source unit 500 illustrated in FIG. 2 has a lamp 501 for outputting a white beam, fly eye integrators 502 and 503, a PS conversion element 504 for converting P-polarized and S-polarized beams to beams having predetermined polarization components and outputting the same, a red reflection dichroic mirror 506, a green and blue reflection dichroic mirror 507, full reflection mirrors 508, 509, 512, 511, and 513, and condenser lenses 515 and 516.

The white beam emitted from the lamp 501 is made uniform by the fly eye integrators 502 and 503 to become the illumination light which is then aligned in polarization direction by the PS conversion element 504. The illumination light aligned in its polarization direction at the PS conversion element 504 and made uniform, that is, the white beam 520, is focused toward the liquid crystal reflection panels 1 to 3 by the main condenser lens 505. The white beam 520 is split by the red reflection dichroic mirror 506 and the green and blue reflection dichroic mirror 507 to separate it into the blue color, green color, and red color. The red reflection beam 521 reflected at the red reflection dichroic mirror 506 is changed in its orientation (polarized) by the full reflection mirror 509, focused by the condenser lens 516, reflected toward the direction of the red color use liquid crystal reflection panel 3 located above this light source 500 at the full reflection mirror 513, and becomes the red color beam 73. The reflection beam 522 having the green and blue spectrum reflected by the green and blue reflection dichroic mirror 507 is changed in its orientation (polarized) by the full reflection mirror 508 and reaches the green reflection dichroic mirror 510. The green color beam is reflected and changed in orientation (polarized) in the direction of the full reflection mirror 511 by this green reflection dichroic mirror 510, changed in orientation to the upward direction of the light source 500 by the full reflection mirror 511, focused toward the green color use liquid crystal reflection panel 2 of the projector apparatus 100 by the condenser lens 514, and becomes the green color beam 72. The beam reflected at the full reflection mirror 508 is focused by the condenser lens 515, focused toward the blue color use liquid crystal reflection panel 1 of the projector apparatus 100 by the full reflection mirror 512, and becomes the blue color beam 71.

In the present specification and drawings, for convenience, in the light source unit 500 illustrated in FIG. 2, the portion for outputting the blue color beam 71 will be referred to as the blue color emitting light source 51, the portion for outputting the green color beam 72 will be referred to as the green color emitting light source 52, and the portion for outputting the red color beam 73 will be referred to as the red color emitting light source 53. These are illustrated by broken lines in FIGS. 1A and 1B.

FIGS. 3A and 3B are sectional views illustrating enlarged the positional relationship of the first liquid crystal reflection panel 1, the blue color emitting light source 51, and the first polarized beam filter 61 arranged between them. As illustrated in FIGS. 3A and 3B, the illustrated projector apparatus 100 has, between the blue color emitting light source 51 and the blue color use liquid crystal reflection panel 1, a first polarized beam filter 61 arranged at the blue color use liquid crystal reflection panel 1 while being inclined by 45 degrees. The first polarized beam filter 61 is arranged while being inclined by about 45 degrees also with respect to the blue color beam 71 output from the blue color emitting light source 51 and striking the blue color use liquid crystal reflection panel 1 almost orthogonal to the plane thereof.

In the same way as above, the illustrated projector apparatus 100 has, between the green color emitting light source 52 and the green color use liquid crystal reflection panel 2, a second polarized beam filter 62 arranged at the green color use liquid crystal reflection panel 2 while being inclined by 45 degrees. The second polarized beam filter 62 is arranged while being inclined by about 45 degrees also with respect to the green color beam 72 output from the green color emitting light source 52 and striking the green color use liquid crystal reflection panel 2 almost orthogonal to the plane thereof. Further, in the same way as above, the illustrated projector apparatus 100 has, between the red color emitting light source 53 and the red color use liquid crystal reflection panel 3, a third polarized beam filter 63 arranged on the red color use liquid crystal reflection panel 3 in a state inclined by 45 degrees. The second polarized beam filter 62 is arranged while being inclined by about 45 degrees also with respect to the green color beam 72 output from the green color emitting light source 52 and striking the green color use liquid crystal reflection panel 2 almost orthogonal to the plane thereof.

[Blue Color Beam Path]

Details of relationship of the blue color use liquid crystal reflection panel 1, the blue color emitting light source 51, and the first polarized beam filter 61 will be explained next by referring to FIGS. 3A and 3B. The blue color emitting light source 51 emits the blue color beam 71 orthogonal to the plane of the blue color use liquid crystal reflection panel 1 through the first polarized beam filter 61. In the present embodiment, the blue color emitting light source 51 emits the blue color beam 71 toward the blue color use liquid crystal reflection panel 1 from the bottom of the blue color use liquid crystal reflection panel 1. The blue color beam 71 output from the blue color emitting light source 51 passes through the first polarized beam filter 61 having the P-polarization axis parallel to the sheet surface and strikes the blue color use liquid crystal reflection panel 1.

As illustrated in FIG. 3A, when the blue color beam 71 is not modulated at the blue color use liquid crystal reflection panel 1, the blue color beam 71 having the P-polarization axis is reflected at the blue color use liquid crystal reflection panel 1, again strikes the first polarized beam filter 61 as it is, and returns to the blue color emitting light source 51.

As illustrated in FIG. 3B, on the other hand, when the blue color beam 71 is modulated when reflected at the blue color use liquid crystal reflection panel 1, the blue color beam 71 having the P-polarization axis parallel to the sheet surface becomes the blue color modulated beam 71m having the S-polarization axis vertical to the sheet surface, strikes the first polarized beam filter 61, is reflected at the first polarized beam filter 61 to the cross prism 10 side, passes through the first linear polarization plate 11 and the first ½ wavelength plate 21, and goes toward the cross prism 10. A reflection face of the first polarized beam filter 61 made of a transparent plate-like member such as glass is formed on the blue color use liquid crystal reflection panel 1 side. Its reflected beam is projected by the projection lens 16. Therefore aberration occurring when the light passes through an obliquely arranged plate-like member can be avoided, and a good projection image can be obtained.

The blue color emitting light source 51 is adjusted in polarization axis in advance so as to output a blue color beam 71 that has the illustrated polarization axis (axis parallel to the drawing) so as to become a P-polarized beam with respect to the first polarized beam filter 61. The orientation of the first polarized beam filter 61 is set to an orientation for passing the P-polarized beam with respect to the first polarized beam filter 61 therethrough and reflecting the S-polarized beam. Accordingly, the blue color beam 71 emitted from the blue color emitting light source 51 having the illustrated polarization axis passes through the first polarized beam filter 61 and strikes the blue color use liquid crystal reflection panel 1.

When the blue color use liquid crystal reflection panel 1, the green color use liquid crystal reflection panel 2, and the red color use liquid crystal reflection panel 3 display 0% black color, the polarization plane of the incident light is not rotated, while when they display 100% of blue, red, and green, the panels 1 to 3 modulate the polarization planes so that the polarization planes of incident light are rotated by about 90 degrees. Which color is to be displayed on each of the color use liquid crystal reflection panels 1 to 3 by the modulation operation depends upon the image signals input to these color use liquid crystal reflection panels 1 to 3 from the image signal processing apparatus (not illustrated).

As illustrated in FIG. 3A, when the blue color use liquid crystal reflection panel 1 displays 0% black color, the blue color beam 71 passes through the first polarized beam filter 61 as it is and strikes the blue color use liquid crystal reflection panel 1, but is reflected at the blue color use liquid crystal reflection panel 1 as it is, passes again through the first polarized beam filter 61, and returns to the blue color emitting light source 61 side.

As illustrated in FIG. 3B, when the blue color use liquid crystal reflection panel 1 displays 100% blue, the blue color beam 71 passes through the first polarized beam filter 61, strikes the blue color use liquid crystal reflection panel 1, and is reflected at the blue color use liquid crystal reflection panel 1, whereupon it is rotated in the polarization axis by 90 degrees by the blue color use liquid crystal reflection panel 1 and therefore becomes the blue color modulated beam 71m having the P-polarization axis. The polarization axis of the blue color modulated beam 71m at this time becomes the S axis orthogonal to the sheet surface, so the beam becomes an S-polarized beam with respect to the first polarized beam filter 61, is reflected at the first polarized beam filter 61, passes through the first linear polarization plate 11, and advance in the direction of the cross prism 10 via the first ½ wavelength plate 21. The blue color modulated beam 71m passes through the first linear polarization plate 11 and the first ½ wavelength plate 21 arranged between the first polarized beam filter 61 and the prism 10 before striking the cross prism 10 in this way. The first linear polarization plate 11 is set in its polarized beam transmission axis in almost the same orientation as the S-polarized beam with respect to the first polarized beam filter 61, so the blue color modulated beam 71m can pass through the first linear polarization plate 11 as it is. The first ½ wavelength plate 21 is set in its axis so as to form an angle of 45 degrees with respect to the polarization axis thereof, so the polarization axis of the blue color modulated beam 71m passing through the first ½ wavelength plate 21 is oriented so as to become the S-polarized beam with respect to the reflection face of the cross prism 10.

As illustrated in FIG. 4, a coating for reflecting the blue color is formed (coated) on the reflection face 10a of the cross prism 10. The blue color modulated beam 71m is reflected at the reflection face 10a, heads toward the projection lens 16, and is projected on the screen (not illustrated) located in front of the projection lens 16 by the projection lens 16.

[Red Color Beam Path]

Next, the red color beam path will be explained. The beam path of the red color is basically the same as the above blue color beam path. The red color beam 73 output from the red color emitting light source 53 located below the red color use liquid crystal reflection panel 3 and the second polarized beam filter 62 passes through the third polarized beam filter 63 and strikes the red color use liquid crystal reflection panel 3. The red color beam 73 is adjusted in advance so as to have a polarization axis that becomes the P-polarized beam with respect to the third polarized beam filter 63. The orientation of the third polarized beam filter 63 is set so as to pass the P-polarized beam and reflect the S-polarized beam with respect to the third polarized beam filter 63, therefore the red color beam 73 having the above polarization axis is passed and made to strike the red color use liquid crystal reflection panel 3.

When the red color use liquid crystal reflection panel 3 displays 0% black color, the red color beam 73 passed through the third polarized beam filter 63 and striking the red color use liquid crystal reflection panel 3 is reflected at the red color use liquid crystal reflection panel 3 as it is, passes again through the third polarized beam filter 63, and returns toward the red color emitting light source 53 side while holding the P-polarization axis as it is.

When the red color use liquid crystal reflection panel 3 displays 100% red, the red color beam 73 passed through the third polarized beam filter 63 and striking the red color use liquid crystal reflection panel 3 becomes a red color modulated beam 73m rotated in its polarization axis by 90 degrees having an S-polarization axis when reflected at the red color use liquid crystal reflection panel 3. Since this red color modulated beam 73m has a polarization axis whereby it becomes an S-polarized beam and becomes an S-polarized beam with respect to the third polarized beam filter 63, it is reflected at the third polarized beam filter 63 and advances to the direction of the cross prism 10 via the third linear polarization plate 13 and the third ½ wavelength plate 23. In this way, the red color modulated beam 73m passes through the third linear polarization plate 13 and the third ½ wavelength plate 23 arranged between the third polarized beam filter 63 and the cross prism 10 before striking the cross prism 10. The third linear polarization plate 13 is set in its polarized beam transmission axis in substantially the same orientation as the S-polarized beam with respect to the third polarized beam filter 63, so the red color modulated beam 73m can pass as it is. The third ½ wavelength plate 23 is set in its axis so as to form am angle of 45 degrees with respect to the polarization axis thereof. The polarization axis of the red color modulated beam 73m passed through this is oriented so that this becomes an S-polarized beam with respect to the reflection face of the cross prism 10. Further, a coating for reflecting the red color is formed on the reflection face 10b of the prism 10, so the red color modulated beam 73m is reflected at the reflection face 10b, goes toward the projection lens 16, and is projected onto the screen by the projection lens 16.

[Green Color Beam Path]

The green color beam path will be explained next. The green color beam path is basically the same as the above blue color beam path. The green color beam 72 output from the green color emitting light source 52 located below the green color use liquid crystal reflection panel 2 and the second polarized beam filter 62 passes through the second polarized beam filter 62 and strikes the green color use liquid crystal reflection panel 2. The green color beam 72 output from the green color emitting light source 52 is adjusted in its polarization axis in advance so as to becomes a P-polarized beam with respect to the second polarized beam filter 62. The orientation of the second polarized beam filter 62 is set to one passing a P-polarized beam with respect to the second polarized beam filter 62, but reflecting an S-polarized beam, therefore the second polarized beam filter 62 passes the green color beam 72 having the polarization axis of the S-polarized beam therethrough and makes it strike the green color use liquid crystal reflection panel 2.

When the green color use liquid crystal reflection panel 2 displays 0% black, the green color beam 72 is reflected at the green color use liquid crystal reflection panel 2 as it is, passes through the second polarized beam filter 62 while holding the P-polarization axis as it is, and returns toward the green color emitting light source 52 side.

When the green color use liquid crystal reflection panel 2 displays 100% green, the green color beam 72 passed through the second polarized beam filter 62 is rotated in its polarization axis by 90 degrees when reflected at the green color use liquid crystal reflection panel 2, therefore becomes the green color modulated beam 72m having the polarization axis of an S-polarized beam. Since the green color modulated beam 72m has the polarization axis of an S-polarized beam and becomes an S-polarized beam with respect to the second polarized beam filter 62, it is reflected at the second polarized beam filter 62 and advances to the direction of the cross prism 10. The green color modulated beam 72m passes through the second linear polarization plate 12 arranged between the second polarized beam filter 62 and the cross prism 10 before striking the cross prism 10. The second linear polarization plate 12 is set in its polarized beam transmission axis in almost the same orientation as the S-polarized beam with respect to the second polarized beam filter 62, so the green color modulated beam 72m can pass through the second linear polarization plate 12 as it is.

Note that, as explained above, the second optical system is not provided with a second wavelength plate corresponding to the first and third wavelength plates. The reflection faces 10a and 10b of the cross prism 10 are formed with coatings for reflecting the blue color and red color, but the green color passes through the reflection faces 10a and 10b, therefore the green color modulated beam 72m striking the prism 10 is passed through, goes toward the projection lens 16, and is projected onto the screen by the projection lens 16.

[Evaluation]

FIG. 5A is a graph illustrating the relationship between the wavelength λ and the transmission rate A of the first polarized beam filter 61 to the third polarized beam filter 63 used in the projector apparatus 100 for, for example, the incident angles 45° and 55° of the blue color beam 71 upon the blue color use liquid crystal reflection panel 1. FIG. 5B is a graph illustrating the relationship between the wavelength λ and the transmission rate μ of the polarized beam splitters used in the projector apparatus illustrated in FIG. 7 for, for example, the incident angles 45° and 55° of the blue color beam upon the blue color use liquid crystal reflection panel 1.

(1) When comparing polarized beam splitters and polarized beam filters, polarized beam filters have very low wavelength dependencies in comparison with polarized beam splitters. Namely, when polarized beam filters are used, all of the blue color, the green color, and the red color having different wavelengths have the same degree of transmission rates, therefore there is little change of the transmission rates due to the wavelength difference depending upon the type of the three primary colors. As a result, for example, the levels of the colors reaching the prism 10 become the same in conditions. In this way, according to the embodiment of the present invention, the drop of the luminance is small, and the drop of the contrast is small. In other words, in comparison with a projector apparatus using polarized beam splitters, the F number of the projector apparatus 100 of an embodiment of the present invention using polarized beam filters becomes small, and, as a result, the luminance becomes high and also the contrast becomes high.

(2) Polarized beam filters have lower incident angle dependencies than polarized beam splitters. Accordingly, the projector apparatus 100 of this embodiment of the present invention using the polarized beam filters has little drop of the transmission rate (has small fluctuation of the transmission rates) even if there is a slight inclination in the beams striking the liquid crystal reflection panels 1 to 3. As a result, for example, leeway is obtained in the arrangement of the blue color emitting light source 51, the blue color use liquid crystal reflection panel 1, and the first polarized beam filter 61. Namely, even if the optical arrangement of the blue color emitting light source 51, the first polarized beam filter 61, and the blue color use liquid crystal reflection panel 1 is slightly off, there is little drop of the luminance and little drop of the contrast. As a result, fine adjustment of positions of the optical parts after assembling the optical systems etc. becomes unnecessary.

Figure 6:
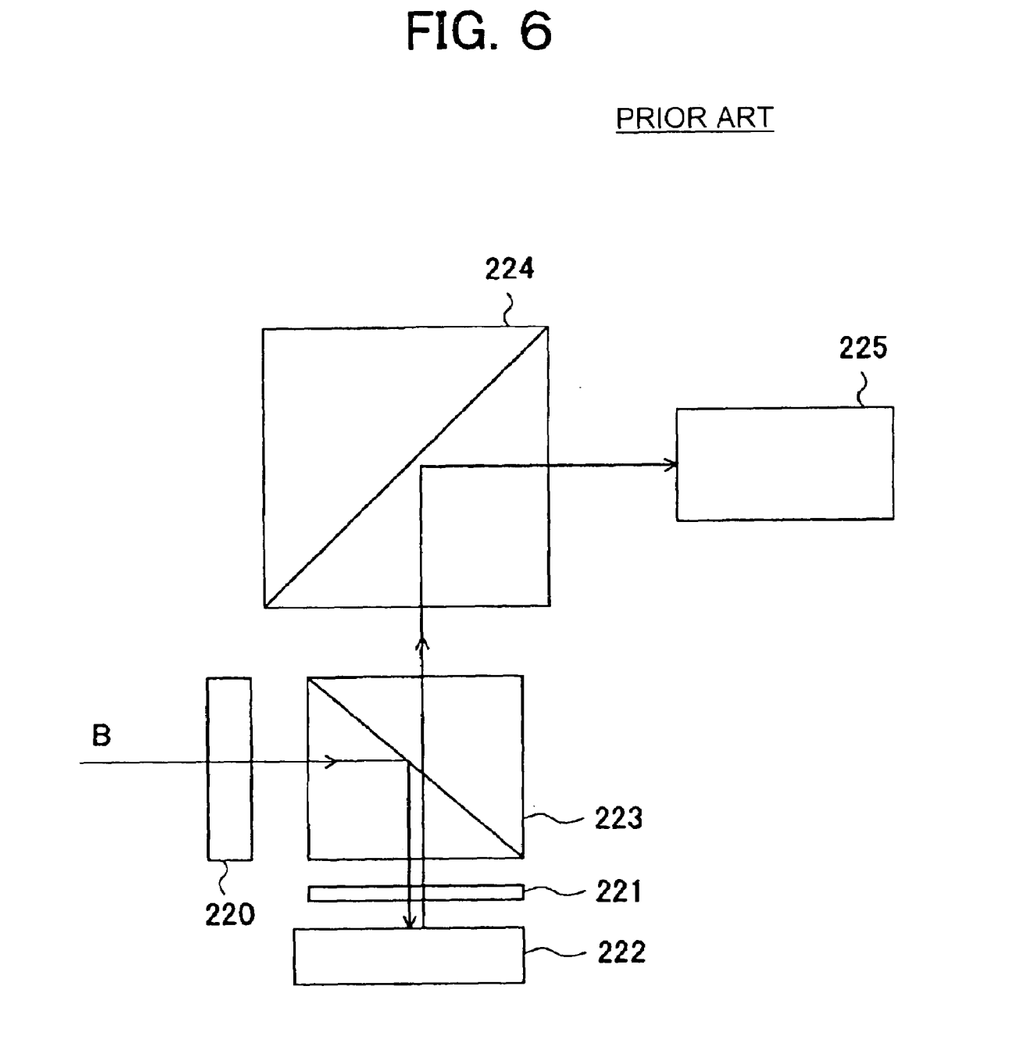
FIG. 6 is a diagram illustrating part of the beam path for blue color in a projector apparatus illustrated in FIG. 7.

FIG. 6 is a diagram illustrating part of the beam path for the blue color of the portion of the condenser lens 220, the third polarized beam splitter 223, the ¼ wavelength plate 221, and the green color use liquid crystal reflection panel 222 in the projector apparatus illustrated in FIG. 7. In the projector apparatus 100, as illustrated in FIG. 3B, when for example the blue color beam 71 is modulated, the blue color beam 71 passes through the first polarized beam filter 61, strikes the blue color use liquid crystal reflection panel 1, is reflected at the first polarized beam filter 61 when modulated at the blue color use liquid crystal reflection panel 1, and goes toward the cross prism 10. Accordingly, it passes through the first polarized beam filter 61 only one time. On the other hand, as illustrated in FIG. 6, when polarized beam splitters are used, the blue color beam passes through the condenser lens 220, strikes the third polarized beam splitter 223, passes through the ¼ wavelength plate 221, and is modulated at the green color use liquid crystal reflection panel 222. Then, the modulated blue color beam strikes the third polarized beam splitter 223 again, passes through the third polarized beam splitter 223, and goes toward the cross prism 224. Namely, it passes through the third polarized beam splitter 223 two times. Therefore, the number of times of passage through the third polarized beam splitter 223 is larger than the case where polarized beam filters are used by one time. When assuming that the transmission rates of the first polarized beam filter 61 and the third polarized beam splitter 223 are the same, in the case illustrated in FIG. 6, a drop in the light occurs by the amount of passage through the third polarized beam splitter 223 one more time. This causes a drop in the luminance and a drop in the contrast. As opposed to this, in the projector apparatus 100 using the polarized beam filters, there is little drop in the light, so the drop in the luminance is reduced and also the drop of the contrast is small.

When considering the configuration or structure of the projector apparatus 100 illustrated in FIGS. 1A and 1B, as schematically illustrated in FIG. 4, three optical systems for three primary colors are neatly arranged around the cross prism 10. When considering this in terms of the plane, for example, the blue color use first optical system (blue color use liquid crystal reflection panel 1, the second polarized beam filter 62, the first linear polarization plate 11, and the first ½ wavelength plate 21) is arranged on the left side of the cross prism 10, the red color use second optical system (red color use liquid crystal reflection panel 3, the third polarized beam filter 63, the third linear polarization plate 13, and the third ½ wavelength plate 23) is arranged on the right side of the cross prism 10, and the green color use third optical system (green color use liquid crystal reflection panel 2, the second polarized beam filter 62, and the second linear polarization plate 12) is arranged on the side opposite to the projection lens 16 across the cross prism 10. These three optical systems are therefore neatly arranged in three directions of the cross prism 10. When considered three-dimensionally, the above three optical systems are arranged at same plane positions on the surfaces of the cross prism 10, so the dimension in the height direction of the projector apparatus 100 can be made small. In such an arrangement, all additional optical systems for classifying the blue color beam 71, the green color beam 72, and the red color beam 73, for example, the full reflection mirrors, are unnecessary. When considering the above, the design of the layout of the projector apparatus 100 is easy and the efficiency of accommodation of the components is high, therefore the apparatus can accommodate them compactly and a reduction of size and lightening of weight can be achieved.

From the viewpoint of the ease of design of layout and accommodation efficiency, the polarized beam splitting means for splitting the polarized beams are not limited to polarized beam filters. A wide variety can be applied to the present invention. Polarized beam filters, however, are small in size and light in weight in comparison with polarized beam splitters. As a result, further reduction of size and lightening of weight of the projector apparatus 100 can be achieved.

In the projector apparatus, the lamp portion of the light source unit and the liquid crystal panel portion consume large electric power and become high in temperature, so cooling is required. In the projector apparatus 100 illustrated in FIG. 1 and FIG. 2, image signals are supplied to the blue color use liquid crystal reflection panel 1, the green color use liquid crystal reflection panel 2, and the red color use liquid crystal reflection panel 3. These are used to drive the liquid crystal panels. Therefore, the power consumption in the projector apparatus 100 is large and it becomes high in temperature, so cooling becomes necessary. Naturally, the lamp 501 portion of the light source unit 500 also consumes large electric power, becomes high in temperature, and requires cooling. In cooling the blue color use liquid crystal reflection panel 1, the green color use liquid crystal reflection panel 2, and the red color use liquid crystal reflection panel 3, since they are arranged at the same height, cooling is easy, for an example of a cooling means and the method, by blowing cooling air in the horizontal direction from a cooling fan (not shown in figures) along the plane of these liquid crystal reflection panels 1 to 3. The cooling effect is also high.

In the example illustrated in FIGS. 1A and 1B, all of the blue color emitting light source 51, the green color emitting light source 52, and the red color emitting light source 53 can be configured by for example the single light source unit 500 illustrated in FIG. 2. The blue color emitting light source 51, the green color emitting light source 52, and the red color emitting light source 53, that is, the parts of the light source unit 500, are located below the prism 10 and the above three optical systems. In this way, the light source unit 500 and the optical systems can be separated three-dimensionally, therefore can be cooled by separate measures.

The amount of heat emitted from the lamp 501 of the light source unit 500 and the amounts of heat emitted from the liquid crystal reflection panels 1 to 3 are very different. The amount of heat emitted from the lamp 501 is overwhelmingly larger. As explained above, since the light source unit 500 and the above optical systems including the liquid crystal reflection panels 1 to 3 can be arranged separately, it is possible to prevent the liquid crystal reflection panels 1 to 3 etc. from being influenced by the heat of the lamp 501 of the light source unit 500. Accordingly, for cooling the liquid crystal reflection panels 1 to 3, just measures for cooling the panels are sufficient. It is not necessary to take useless cooling measure. From this viewpoint as well, the cooling use fan may be small in size, and the projector apparatus 100 can be further reduced in size and reduced in weight. Also, the noise of the cooling use fan is low.

When arranging the light source unit 500, especially the lame 501, at the outside of the housing of the projector apparatus 100 while accommodating the components illustrated in FIGS. 1A and 1B and only the white beam 520 from the lamp 501 is introduced, the cooling measures become very easy.

The connection parts of the liquid crystal reflection panels 1 to 3 (portions illustrated as having large number of cables connected) are oriented in different directions. In addition, since the liquid crystal reflection panels 1 to 3 are located at the top, laying cables to these connection parts is easy. The numbers of cables to the liquid crystal reflection panels 1 to 3 become considerably large, so the mounting surface have big effects. In this way, in the projector apparatus 100, the effects are obtained that the cables can be easily laid, the space for the cables can be kept small, and compact layout of cables is possible.

As illustrated in FIGS. 1A and 1B, no components are arranged at the periphery of the projection lens 16. Therefore the flexibility of arrangement of the projection lens 16 is high. Also, a vertical direction and/or lateral direction shift mechanism (not shown in figures) can be easily mounted for the projection lens 16. By moving the projection lens 16 substantially parallel to the emission face of the cross prism 10, the function of changing the position of the projected image can be easily realized.

As illustrated in FIGS. 1A and 1B, the liquid crystal reflection panels 1 to 3, the green color use liquid crystal reflection panel 2, and the red color use liquid crystal reflection panel 3 are arranged facing down. Accordingly, the dust etc. floating in the housing of the projector apparatus 100 have a hard time sticking to the surfaces of the liquid crystal reflection panels 1 to 3, the drop in the levels of the polarized beams due to the adhesion of dust is small, and there is little drop in the display image quality.

The focus optical systems including the liquid crystal reflection panels 1 to 3 are arranged compactly around the cross prism 10, and the mechanical structural rigidity can be easily improved. For this reason, deviation in the pixel positions etc. among the three liquid crystal reflection panels 1 to 3 do not easily occur and an image of a high quality is obtained.

While the invention has been described with reference to specific embodiments chosen for purpose of illustration, it should be apparent that numerous modifications could be made thereto by those skilled in the art without departing from the basic concept and scope of the invention.

For example, in the projector apparatus 100 illustrated in FIGS. 1A and 1B, it is also possible to reverse the arrangement of the components vertically so that the light source 500 (blue color emitting light source 51, the green color emitting light source 52, and the red color emitting light source 53) are at the top and the cross prism 10 is at the bottom. It is also possible to arrange-the light source 500, the cross prism 10, etc. on the same plane side by side. Further, it is also possible to provide individual light sources corresponding to the three colors.

I claim:

1. An image projection apparatus having three reflection-type image display units using three primary color beams of red, green, and blue as illumination light, and modulating said primary color beams in accordance with image display signals to display images, a cross prism for combining the modulated primary color beams, and a projection lens for projecting the combined beam to a screen, said apparatus comprising:

polarized beam filters, each arranged at an orientation forming an angle of about 45 degrees with respect to an incident face of said cross prism and a display surface of an image display unit, so that the modulated primary color image beam emitted from said image display unit is reflected and strikes the incident face of said cross prism and each passing a first polarized beam therethrough and reflecting a second polarized beam having a polarization axis orthogonal to said first polarized beam;

display surfaces of said image display units being arranged so as to be substantially parallel to planes vertical to four inside surfaces of said cross prism and being substantially orthogonal to three primary color incident faces of the cross prism; and the primary color illumination beams incident from the opposite side of said image display units across said polarized beam filters illuminate said image display units;

wherein, for each of two primary color beams among the three primary color beams forming primary colors by reflecting light at the reflection faces of said cross prism, a ½ wavelength plate is arranged between said cross prism and the corresponding polarized beam filter for making the light strike a reflection face of said cross prism to become an S-polarized beam.

2. The image projection apparatus as set forth in claim 1, wherein the primary color illumination beam striking each polarized beam filter is set so that a polarization plane thereof has an orientation of a P-polarized beam with respect to the polarized beam filter.

3. The image projection apparatus as set forth in claim 1, wherein each polarized beam filter is arranged having an orientation so as to reflect an S-polarized beam and pass a P-polarized beam.

4. The image projection apparatus as set forth in claim 1, wherein each polarized beam filter is comprised of a transparent plate-like member, with a polarization separation plane for passing said first polarized beam and reflecting said second polarized beam formed at the image display unit side of said plate-like member.

5. The image projection apparatus as set forth in claim 1, wherein when an image display unit displays 0% black color, said image display unit does not modulate said incident primary color beam, while whereas when said image display unit displays 100% of the corresponding primary color beam, said image display unit modulates said incident primary color beam so that its polarization plane thereof is rotated by about 90 degrees.

6. The image projection apparatus as set forth in claim 1, wherein a linear polarizing means is arranged between said ½ wavelength plate and said polarized beam filter so as to be substantially parallel to said ½ wavelength plate, and wherein a transmission axis of the linear polarizing means is configured in orientation to give substantially a P-polarized beam with respect to a reflection face of said cross prism.

7. The image projection apparatus as set forth in claim 1, further comprising linear polarizing means arranged at a reflection face of said cross prism to be substantially parallel to the incident face of said cross prism for one primary color beam formed by passage of light, wherein a transmission axis of the linear polarizing means is oriented to form a P-polarized beam with respect to the reflection face of said cross prism.

8. An image projection apparatus comprising:

a cross prism;

three optical systems having respective reflection type image display units arranged at side faces in three directions of said cross prism and arranged substantially parallel to planes vertical to four inside surfaces of said cross prism and substantially orthogonal to corresponding side faces and polarized beam splitting portions for splitting the incident light, modulating illumination lights of three primary colors of red, green, and blue by said image display units, and outputting results via said polarized beam splitting portions to said cross prism; and a projection lens arranged on an other side of said cross prism at which said three optical systems are not arranged;

wherein, for each of two illumination lights among the three primary colors formed by reflecting light at the reflection side faces of said cross prism, a ½ wavelength plate is arranged between said cross prism and the corresponding polarized beam splitting portions for making the light strike a reflection side face of said cross prism to become an S-polarized beam.

9. The image projection apparatus as set forth in claim 8, wherein said three optical systems are substantially arranged on a common plane.

10. The image projection apparatus as set forth in claim 9, further comprising cooling means for cooling said image display units substantially arranged on the common plane.

11. The image projection apparatus as set forth in claim 8, wherein said projection lens is configured to be movable vertically and/or laterally substantially parallel to said other face of said cross prism.

12. The image projection apparatus as set forth in claim 8, wherein each said image display unit is arranged so that a reflection face thereof is oriented downward.

13. The image projection apparatus as set forth in claim 8, further comprising a light source unit for providing said three primary color beams striking said image display units after passing through said polarized beam splitting portions from below said three optical systems.

* * * * *